(12) United States Patent
Hörold et al.

(10) Patent No.: US 6,645,625 B2
(45) Date of Patent: Nov. 11, 2003

(54) STABILIZED RED PHOSPHORUS MATERIAL AND A PROCESS FOR ITS PREPARATION

(75) Inventors: Sebastian Hörold, Erftstadt (DE); Jürgen Laubner, Köln (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 10/002,219

(22) Filed: Nov. 28, 2001

(65) Prior Publication Data

US 2002/0127403 A1 Sep. 12, 2002

(30) Foreign Application Priority Data

Nov. 28, 2000 (DE) .......................... 100 58 922

(51) Int. Cl.$^7$ ................................. B32B 5/16
(52) U.S. Cl. ................. 428/402; 428/402.24; 428/403; 428/407; 427/215; 427/216; 427/217; 423/322; 149/19
(58) Field of Search ................. 428/402, 402.24, 428/403, 407; 423/322; 149/29; 427/215, 216, 217

(56) References Cited

U.S. PATENT DOCUMENTS

| | | | |
|---|---|---|---|
| 3,883,475 A | | 5/1975 | Racky et al. ............... 524/414 |
| 4,208,317 A | * | 6/1980 | Cerny et al. ............... 523/205 |
| 4,242,240 A | | 12/1980 | Cerny et al. ............... 524/37 |
| 4,315,897 A | | 2/1982 | Staendeke et al. .......... 423/274 |
| 4,440,880 A | * | 4/1984 | Albanesi et al. ........... 523/205 |
| 4,853,288 A | * | 8/1989 | Staendeke et al. ..... 428/402.24 |
| 5,049,599 A | | 9/1991 | Steiert et al. ............... 524/80 |
| 5,093,199 A | | 3/1992 | Staendeke et al. .......... 428/403 |
| 5,624,979 A | | 4/1997 | Kleiner et al. .............. 523/453 |
| 5,693,842 A | | 12/1997 | Kleiner et al. ............... 558/82 |
| 5,759,691 A | | 6/1998 | Scholz et al. ............... 428/413 |
| 5,759,692 A | | 6/1998 | Scholz et al. ............... 428/413 |
| 5,830,973 A | | 11/1998 | Hörold et al. .............. 528/108 |
| 5,854,371 A | | 12/1998 | Hörold ....................... 528/108 |
| 5,959,043 A | | 9/1999 | Hörold et al. .............. 525/533 |
| 6,011,172 A | | 1/2000 | Weferling et al. ............ 562/8 |

FOREIGN PATENT DOCUMENTS

| | | |
|---|---|---|
| EP | 0 028 744 B1 | 5/1981 |
| EP | 0 028 744 A | 5/1981 |
| EP | 0 176 836 B1 | 4/1986 |
| EP | 0 176 836 A2 | 4/1986 |
| EP | 0 283 759 B1 | 9/1988 |
| EP | 0 373 803 B1 | 7/1990 |
| EP | 0 378 803 A1 | 7/1990 |
| EP | 0 911 366 | 4/1999 |

OTHER PUBLICATIONS

English Abstract for EP 0176836, Apr. 9, 1986.
EPO Search Report for application No. 01126914, mail date Mar. 8, 2002.

* cited by examiner

*Primary Examiner*—Leszek Kiliman
(74) *Attorney, Agent, or Firm*—Anthony A. Bisulca

(57) ABSTRACT

The invention relates to a stabilized, pulverulent red phosphorus material composed of phosphorus particles whose particle size is not more than 2 mm, and whose surface has been covered with a thin layer of an oxidation stabilizer, wherein the oxidation stabilizer is silver, and also to the use of the same, and to a process for its preparation.

23 Claims, No Drawings

STABILIZED RED PHOSPHORUS MATERIAL AND A PROCESS FOR ITS PREPARATION

BACKGROUND OF THE INVENTION

The invention relates to a stabilized, pulverulent red phosphorus material composed of phosphorus particles whose particle size is not more than 2 mm, and whose surface has been covered with a thin layer of an oxidation stabilizer, and also to the use of the same, and to a process for its preparation.

It is known that heat can be used to obtain red phosphorus by converting yellow phosphorus into the more stable red form. The resultant crude red phosphorus has a content of from about 0.5 to 1.5% by weight of yellow phosphorus at the end of the reaction, and forms a compact mass. It is ground in an atmosphere of inert gas and freed from yellow phosphorus by boiling an aqueous suspension with dilute sodium hydroxide solution. Rotating reactors are usually used for the conversion process, and the product is pulverulent red phosphorus.

The aqueous suspension of red phosphorus removed from the reactor is heated in stirred vessels with steam and freed from the residual content of about 0.1% by weight of yellow phosphorus by gradually adding sodium hydroxide solution.

Red phosphorus is used in pyrotechnic applications and in producing match-striking surfaces, and as a flame retardant for plastics, e.g. polyamides and polyurethanes.

It is known that a chemical reaction takes place on the surface of red phosphorus in a humid atmosphere, forming phosphine ($PH_3$) and various phosphorus-containing acids in oxidation states from +1 to +5 via oxidation and disproportionation.

Phosphine is a toxic gas whose MAC is 0.1 ppm. Low concentrations can be detected by a garlic-like odor (the odor threshold being 0.02 ppm). The various phosphorus-containing acids cause corrosion problems in pyrotechnic and flame-retardant applications, especially corrosion of copper.

An object was therefore to improve the unsatisfactory oxidation resistance of red phosphorus by taking appropriate stabilization measures. For the purposes of the invention, the term "stabilization" here implies a measure which gives the red phosphorus improved protection from the results of exposure to the atmosphere, therefore contributing, for example, to reduced formation of phosphorus oxoacids and phosphine during storage and further processing.

EP-0 378 803 B1 (DE-C 39 00 965) discloses that the oxidation resistance of red phosphorus can be improved by tin oxide hydrate precipitation.

EP-0 028 744 B1 (DE-C 29 45 118) proposes using a combination of aluminum hydroxide and cured epoxy resin to stabilize red phosphorus.

EP-0 283 759 B1 (U.S. Pat. No. 4,853,288) describes a stabilized pulverulent red phosphorus composed of phosphorus particles whose particle size is no more than 2 mm and whose surface has been covered with a thin layer of an oxidation stabilizer which is composed of at least one metal hydroxide with little or no solubility in water and of a polycondensation product made from melamine and formaldehyde. The oxidation resistance values obtained from the combinations of tin oxide hydrate and melamine-formaldehyde resin described in Examples 17 and 18 of that specification are certainly good.

However, there continues to be a requirement for red phosphorus products with improved oxidation resistance, since, depending on the temperature and the humidity of the ambient air, there is a possibility of exceeding the odor threshold for phosphine, particularly during processing.

An attempt to bind phosphine is described in DE-A 2 308 104. This specification describes molding compositions made from thermoplastics with red phosphorus and with addition of a phosphine-binding substance. Phosphine-binding substances mentioned are $MoS_2$, $PbO_2$, $AgNO_3$, $HgCl_2$, $FeCl_3$, $CuO$, and activated carbon. The red phosphorus here is mixed with the phosphine-binding substance and incorporated into the polymer concerned. The disadvantage of this process is the need to add a further additive in the form of the phosphine-binding substance: in some cases the water-solubility of the compounds mentioned is high, polymer compatibility is unsatisfactory, and thermal stability is low.

SUMMARY OF THE INVENTION

An object was therefore to make a further improvement in oxidation resistance. Surprisingly, it has now been found that the oxidation resistance of red phosphorus can be markedly improved by applying metallic silver, in particular in combination with a metal hydroxide and with a fully cured synthetic thermoset resin.

The effect of the invention may, where appropriate, be further amplified by also applying a phlegmatizer by the process of EP-0 176 836 B1 (DE-A 34 36 161).

The term "phlegmatization" here implies a measure which reduces the tendency of red phosphorus to form dust, thus reducing the risk that a dust explosion may occur, and increasing process safety.

DETAILED DESCRIPTION OF THE INVENTION

The invention therefore provides a stabilized pulverulent red phosphorus material of the type mentioned at the outset, wherein the oxidation stabilizer is silver.

The stabilized, pulverulent red phosphorus material preferably comprises from 0.05 to 2% by weight of silver, particularly preferably from 0.1 to 0.4% by weight of silver.

The stabilized, pulverulent red phosphorus material preferably comprises an additional stabilizer.

The additional stabilizer is preferably a metal hydroxide.

The starting materials preferably used for the metal hydroxide are the hydroxides, oxide hydrates and/or oxides of aluminum, silicon, titanium, chromium, manganese, zinc, germanium, zirconium, niobium, cadmium, tin, lead, bismuth and/or cerium.

The red phosphorus material preferably comprises from 0.5 to 10% by weight, particularly preferably from 1 to 3% by weight, of the metal hydroxides.

The stabilized, pulverulent red phosphorus material has preferably been microencapsulated by a synthetic thermoset resin.

The synthetic thermoset resin is preferably an epoxy resin, a melamine resin, a phenolic resin, or a polyurethane.

The stabilized, pulverulent red phosphorus material preferably comprises from 0.2 to 10% by weight, in particular from 0.5 to 8% by weight, and particularly preferably from 2 to 5% by weight, of the thermoset plastics.

The stabilized, pulverulent red phosphorus material has preferably been covered by a thin layer of a phlegmatizer.

The phlegmatizer is preferably a water-emulsifiable organic compound.

The phlegmatizer is preferably di-2-ethylhexyl phthalate or polyglycols.

The stabilized, pulverulent red phosphorus material preferably comprises from 0.05 to 2% by weight, particularly preferably from 0.3 to 1.5% by weight, of the phlegmatizer.

The invention particularly provides a stabilized, pulverulent red phosphorus material which comprises from 76 to 99.2% by weight of red phosphorus, from 0.05 to 2% by weight of silver, from 0.5 to 10% by weight of metal hydroxide, from 0.2 to 10% by weight of synthetic thermoset resin, and from 0.05 to 2% by weight of phlegmatizer.

The invention also provides a process for preparing a stabilized, pulverulent red phosphorus material, which comprises in succession, stirring a water-soluble silver compound into an aqueous suspension of the (untreated) red phosphorus and adjusting the pH to 7;

stirring a water-soluble metal compound into this suspension and adjusting the pH to a value of from 4 to 9, and continuing to stir at from 40 to 80° C. for from 0.5 to 3 hours;

then adding an aqueous emulsion comprising an epoxy resin and comprising an epoxy resin hardener and continuing to stir at from 40 to 80° C. for from 0.5 to 3 hours; adding an aqueous emulsion of the water-emulsifiable organic compound serving as phlegmatizer and adjusting the pH to a value of from 5 to 9, and continuing to stir at from 20 to 90° C. for from 0.5 to 3 hours and then filtering the product and drying the same at temperatures from 80 to 150° C.

In one particular embodiment of the invention, the emulsion obtained after step a) is filtered and the resultant silver-containing red phosphorus material is dried at temperatures of from 80 to 150° C.

In another embodiment of the invention, only steps a) and b) are carried out, and the resultant silver-containing red phosphorus material stabilized by a metal hydroxide is dried at temperatures of from 80 to 150° C.

In another embodiment of the invention, steps a) to c) are carried out, and the resultant silver-containing red phosphorus material stabilized by a metal hydroxide and by a synthetic thermoset resin is dried at temperatures of from 80 to 150° C.

An alternative is to carry out only steps a), b), and d), and use temperatures of from 80 to 150° C. to dry the resultant silver-containing phosphorus material stabilized by a metal hydroxide and provided with a phlegmatizer.

The invention also provides a process for preparing a stabilized, pulverulent red phosphorus material, wherein the materials used in each instance comprise, as desired, from 76 to 99.2% by weight of red phosphorus, from 0.05 to 2% by weight of water-soluble silver compound, from 0.5 to 10% by weight of metal hydroxide, metal oxide hydrate, or metal oxide from 0.2 to 10% by weight of synthetic thermoset resin, and from 0.05 to 2% by weight of phlegmatizer.

Finally, the invention provides the use of the stabilized, pulverulent red phosphorus material as flame retardant or for preparing flame retardants.

An example of a method for carrying out the process for preparing the stabilized, pulverulent red phosphorus material consists in stirring a water-soluble silver compound into an aqueous suspension of red phosphorus and adjusting the pH to 7, then stirring in a water-soluble tin compound, adjusting the pH value to from 4 to 9, and continuing to stir at a temperature of from 40 to 80° C. for from 0.5 to 3 hours, then adding an aqueous emulsion of the epoxy resin and the hardener and continuing to stir at a temperature of from 40 to 80° C. for from 0.5 to 3 hours, using from 76 to 99.2% by weight of red phosphorus, 0.05 to 2% by weight of silver, from 10 to 0.5% by weight of tin oxide hydrate, based on SnO, and from less than 10 to 0.2% by weight of epoxy resin or melamine resin, and finally filtering off the phosphorus particles and drying these at an elevated temperature.

Another method of carrying out the process is to prepare stabilized and phlegmatized pulverulent red phosphorus material by stirring a water-soluble silver compound into an aqueous suspension of red phosphorus and then stirring in a water-soluble tin compound, adjusting the pH value to from 4 to 9, continuing stirring at a temperature of from 40 to 80° C. for from 0.5 to 3 hours, then adding an aqueous emulsion of the epoxy resin or a solution of the epoxy resin in a water-miscible solvent, stirring at a temperature of from 40 to 80° C. for from 0.5 to 3 hours, and then, where appropriate, adding an aqueous emulsion of di-2-ethylhexyl phthalate and stirring at a temperature of from 20 to 90° C. for from 0.5 to 3 hours, using from 76 to 99.2% by weight of red phosphorus, from 0.05 to 2% by weight of silver, from 10 to 0.5% by weight of tin oxide hydrate, based on SnO, from 10 to 0.2% by weight of epoxy resin, and from 2 to 0.05% by weight of di-2-ethylhexyl phthalate, and finally filtering off the phosphorus particles and drying the same at an elevated temperature. The final drying of the phosphorus particles filtered off may preferably take place at a temperature of from 80 to 120° in a stream of nitrogen.

The final drying of the phosphorus particles filtered off may preferably take place at a temperature of from 80 to 120° C. in a stream of nitrogen.

The water-miscible solvent used is preferably acetone, methanol or ethanol.

EXAMPLES

An example of the preferred particle size of the pulverulent red phosphorus material is in the range from 0.1 to 500 μm, particularly preferably from 0.1 to 150 μm.

The tables and examples below give further illustration of the invention. Percentage data are in % by weight.

Determination of Oxidation Resistance

Oxidation resistance was determined by an aging test under hot and humid conditions. For this, 5.0 g of red phosphorus (particle size: 100%<150 μm) was weighed into a crystallization dish of diameter 50 mm and the dish was stored in a closed glass vessel at 80° C. and 100% relative humidity. The phosphine formed during this process was either flushed out of the glass vessel by a stream of air (10 l/h) and reacted with 2.5% strength mercury(II) chloride solution in a gas-scrubber bottle, using titration to determine the amount of hydrochloric acid produced, or was collected using a "phosphine 0.1/a" or "50/a" Drager tube.

To determine the content of the various phosphorus oxoacids, the phosphorus specimen was transferred to a 250 ml glass beaker, treated with 200 ml of 1% strength hydrochloric acid, heated at boiling point for 10 minutes, and then filtered. The molybdatovanadatophosphoric acid method was then used to determine acid-soluble phosphorus photometrically in the filtrate.

To determine the initial value for acid-soluble phosphorus, the red phosphorus was subjected to the same analysis procedure without any prior aging under hot and humid conditions. The value determined is then subtracted from the value obtained when determining the content of acid-soluble phosphorus after aging under hot and humid conditions.

Materials Used

Epoxy resin: Beckopox EP 140, bisphenol-A bisglycidyl ester, EP value 0.54 mol/100 g, polyamine hardener EH 623w, water-dilutable amine hardener from Vianova Resins GmbH, Mainz, Germany.

Melamine resin: Madurit MW 909, partially etherified melamine-formaldehyde resin, water-soluble powder, Vianova Resins GmbH, Mainz, Germany.

Example 1

Inventive 2000 ml of an aqueous red phosphorus suspension comprising 1000 g of red phosphorus are heated to 60° C. in a stirred glass reactor. The pH value of the suspension is adjusted to 7. A solution of 1.6 g of silver nitrate in 20 ml of water is then stirred in, and the pH value is maintained at 7. The mixture is then stirred at 60° C. for an hour at pH 7. After filtration the filter cake is washed with water and dried at 120° C. in a stream of nitrogen. The phosphorus content is 99.8%.

Example 2

Inventive 2000 ml of an aqueous red phosphorus suspension comprising 1000 g of red phosphorus are heated to 60° C. in a stirred glass reactor. The pH value of the suspension is adjusted to 7. A solution of 3.2 g of silver nitrate in 20 ml of water is then stirred in, and the pH value is maintained at 7. The mixture is then stirred at 60° C. for an hour at pH 7. After filtration the filter cake is washed with water and dried at 120° C. in a stream of nitrogen. The phosphorus content is 99.6%.

Example 3

Inventive 2000 ml of an aqueous red phosphorus suspension comprising 1000 g of red phosphorus are heated to 60° C. in a stirred glass reactor. The pH value of the suspension is adjusted to 7. A solution of 4.8 g of silver nitrate in 20 ml of water is then stirred in, and the pH value is maintained at 7. The mixture is then stirred at 60° C. for an hour at pH 7. After filtration the filter cake is washed with water and dried at 120° C. in a stream of nitrogen. The phosphorus content is 99.4%.

Example 4

Inventive 2000 ml of an aqueous red phosphorus suspension comprising 1000 g of red phosphorus are heated to 60° C. in a stirred glass reactor. The pH value of the suspension is adjusted to 7. A solution of 3.2 g of silver nitrate in 20 ml of water is then stirred in, and the pH value is maintained at 7. The mixture is then stirred at 60° C. for an hour at pH 7. The pH value is adjusted to 5 by adding 5% strength sulfuric acid. This is followed by addition of 48 g of $SnSO_4$ in 200 ml of water and stirring at 60° C. for 20 min. After filtration the filter cake is washed with water and dried at 120° C. in a stream of nitrogen. The phosphorus content is 97.8%.

Example 5

Inventive 2000 ml of an aqueous red phosphorus suspension comprising 1000 g of red phosphorus are heated to 60° C. in a stirred glass reactor. The pH value of the suspension is adjusted to 7. A solution of 3.2 g of silver nitrate in 20 ml of water is then stirred in, and the pH value is maintained at 7. The mixture is then stirred at 60° C. for an hour at pH 7. The pH value is adjusted to 3 by adding 5% strength sulfuric acid. This is followed by addition of 99.2 g of $MgSO_4*H_2O$ in 200 ml of water, the pH value is adjusted to 12, and stirring at 60° C. for 20 min. After filtration the filter cake is washed with water and dried at 120° C. in a stream of nitrogen. The phosphorus content is 97.8%.

Example 6

Inventive 2000 ml of an aqueous red phosphorus suspension comprising 1000 g of red phosphorus are heated to 60° C. in a stirred glass reactor. The pH value of the suspension is adjusted to 7. A solution of 3.2 g of silver nitrate in 20 ml of water is then stirred in, and the pH value is maintained at 7. The mixture is then stirred at 60° C. for an hour at pH 7. The pH value is adjusted to 3 by adding 5% strength sulfuric acid. This is followed by addition 246 g $Al_2(SO_4)_3*18\ H_2O$ in 200 ml of water, the pH value is adjusted to 7, and stirring at 60° C. for 20 min. After filtration the filter cake is washed with water and dried at 120° C. in a stream of nitrogen. The phosphorus content is 97.8%.

Example 7

Inventive 2000 ml of an aqueous red phosphorus suspension comprising 1000 g of red phosphorus are heated to 60° C. in a stirred glass reactor. The pH value of the suspension is adjusted to 7. A solution of 3.2 g of silver nitrate in 20 ml of water is then stirred in, and the pH value is maintained at 7. The mixture is then stirred at 60° C. for an hour at pH 7. The pH value is adjusted to 5 by adding 5% strength sulfuric acid. This is followed by addition of 48 g of $SnSO_4$ in 200 ml of water and stirring at 60° C. for 20 min. An aqueous emulsion comprising a water-emulsifiable epoxy resin and comprising a water-emulsifiable polyamine hardener (20 g of Beckopox EP 122w and 20 g of Beckopox EH 623w) is then stirred in and the mixture is stirred at about 60° C. for an hour, after which a further 20 g of Beckopox EP 122w and 20 g of Beckopox EH 623w are emulsified in water and added, and this is followed by stirring at 60° C. for about 1 h. The product is filtered off. After filtration the filter cake is washed with water and dried at 120° C. in a stream of nitrogen. The phosphorus content is 91.0%.

Example 8

Inventive 2000 ml of an aqueous red phosphorus suspension comprising 1000 g of red phosphorus are heated to 60° C. in a stirred glass reactor. The pH value of the suspension is adjusted to 7. A solution of 3.2 g of silver nitrate in 20 ml of water is then stirred in, and the pH value is maintained at 7. The mixture is then stirred at 60° C. for an hour at pH 7. The pH value is adjusted to 5 by adding 5% strength sulfuric acid. This is followed by addition of 48 g of $SnSO_4$ in 200 ml of water and stirring at 60° C. for 20 min. An aqueous solution of a melamine resin (40 g of Madurit MW 909) is then stirred in and the pH value is adjusted to 4.5 using dilute sulfuric acid. After an hour of stirring at 60° C., a further 40 g of Madurit MW 909 in solution in about 100 ml of water are added. After an hour of stirring at pH 4.5 at 60° C., the product is filtered off. After filtration the filter cake is washed with water and dried at 120° C. in a stream of nitrogen. The phosphorus content is 89.8%.

Example 9

Comparative Example 2000 ml of an aqueous red phosphorus suspension comprising 1000 g of red phosphorus are heated to 60° C. in a stirred glass reactor. The pH value is adjusted to 5 by adding 5% strength sulfuric acid. This is followed by addition of 48 g of $SnSO_4$ in 200 ml of water and stirring at 60° C. for 20 min. The product is then filtered off. After filtration the filter cake is washed with water and dried at 120° C. in a stream of nitrogen. The phosphorus content is 97.5%.

Example 10

Comparative Example 2000 ml of an aqueous suspension of red phosphorus comprising 1000 g of red phosphorus are heated to 60° C. in a stirred glass reactor. The pH value is adjusted to 5 by adding 5% strength sulfuric acid. An aqueous solution of a melamine resin (40 g of Madurit MW 909) is then stirred in and the pH is adjusted to 4.5 using dilute sulfuric acid. After one hour of stirring at 60° C. a further 40 g of Madurit MW 909 dissolved in about 100 ml of water are added. After an hour of stirring at pH 4.5 and 60° C. the product is filtered off. After filtering, the filter cake is washed with water and dried at 120° C. in a stream of nitrogen. The phosphorus content is 91.8%.

Example 11

Comparative Example 2000 ml of an aqueous suspension of red phosphorus comprising 1000 g of red phosphorus are heated to 60° C. in a stirred glass reactor. The pH value is adjusted to 5 by adding 5% strength sulfuric acid. 48 g of $SnSO_4$ in 200 ml of water are then added, and the mixture is stirred at 60° C. for 20 min. An aqueous solution of a melamine resin (40 g of Madurit MW 909) is then stirred in and the pH is adjusted to 4.5 using dilute sulfuric acid. After one hour of stirring at 60° C. a further 40 g of Madurit MW 909 dissolved in about 100 ml of water are added. After an hour of stirring at pH 4.5 and 60° C. the product is filtered off. After filtering, the filter cake is washed with water and dried at 120° C. in a stream of nitrogen. The phosphorus content is 89.8%.

TABLE 1

5/28 Properties of the pulverulent red phosphorus material of examples 1 to 11

| Example | Stabilizer | Phosphine formation* mg $PH_3$/(g*day) | Acid-soluble phosphorus compounds* mg P/(g*day) |
|---|---|---|---|
| 1 | 0.1% Ag | 0.87 | 34.3 |
| 2 | 0.2% Ag | 0.02 | 35.6 |
| 3 | 0.3% Ag | 0.02 | 37.6 |
| 4 | 0.2% Ag, 2% $SnO*H_2O$ | 0.02 | 4.8 |
| 5 | 0.2% Ag, 2% $Mg(OH)_2$ | <0.01 | 33.5 |
| 6 | 0.2% Ag, 2% $Al(OH)_3$ | 0.90 | 16.0 |
| 7 | 0.2% Ag, 2% $SnO*H_2O$ 8% epoxy resin | <0.01 | 1.2 |
| 8 | 0.2% Ag, 2% $SnO*H_2O$ 8% melamine resin | <0.01 | 0.1 |
| 9 (comparison) | 2% $SnO*H_2O$ | 0.80 | 5.2 |
| 10 (comparison) | 8% melamine resin | 0.06 | 3.5 |
| 11 (comparison) | 2% $SnO*H_2O$ 8% melamine resin | 0.02 | 0.2 |

*after aging in hot and humid conditions (80° C. and 100% atmospheric humidity)

What is claimed is:

1. A stabilized, pulverulent red phosphorus material comprising phosphorus particles whose particle size is not more than 2 mm and whose surface has been covered with a thin layer of an oxidation stabilizer, wherein the oxidation stabilizer is silver, and an additional stabilizer, wherein the additional stabilizer is a metal hydroxide.

2. The stabilized, pulverulent red phosphorus material as claimed in claim 1, which comprises from 0.05 to 2% by weight of silver.

3. The stabilized, pulverulent red phosphorus material as claimed in claim 1, wherein the starting materials used for the metal hydroxide are selected from the group consisting of hydroxides, oxide hydrates and oxides of aluminum, silicon, titanium, chromium, manganese, zinc, germanium, zirconium, niobium, cadmium, tin, lead, bismuth or cerium.

4. The stabilized, pulverulent red phosphorus material as claimed in claim 1, which comprises amounts of from 0.5 to 10% by weight of the metal hydroxides.

5. The stabilized, pulverulent red phosphorus material as claimed in claim 1, which has been microencapsulated with a synthetic thermoset resin.

6. The stabilized, pulverulent red phosphorus material as claimed in claim 5, wherein the thermoset resin is an epoxy resin, a melamine resin, a phenolic resin, or a polyurethane.

7. The stabilized, pulverulent red phosphorus material as claimed in claim 6, which comprises amounts of from 0.2 to 10% by weight of the thermoset resin.

8. The stabilized, pulverulent red phosphorus material as claimed in claim 1, which has been covered by a thin layer of a phlegmatizer.

9. The stabilized, pulverulent red phosphorus material as claimed in claim 8, wherein the phlegmatizer is a water-emulsifiable organic compound.

10. The stabilized, pulverulent red phosphorus material as claimed in claim 8, wherein the phlegmatizer is di-2-ethylhexyl phthalate or polyglycols.

11. The stabilized, pulverulent red phosphorus material as claimed in claim 8, which comprises from 0.05 to 2% by weight of the phlegmatizer.

12. A stabilized, pulverulent red phosphorus material comprising from 76 to 99.2% by weight of red phosphorus,
 from 0.05 to 2% by weight of silver,
 from 0.5 to 10% by weight of metal hydroxide,
 from 0.2 to 10% by weight of synthetic thermoset resin, and
 from 0.05 to 2% by weight of phlegmatizer.

13. A process for preparing a stabilized, pulverulent red phosphorus material comprising the steps of, in succession, a) stirring a water-soluble silver compound into an aqueous suspension of the (untreated) red phosphorus and adjusting the pH to 7;

b) stirring a water-soluble metal compound into this suspension and adjusting the pH to a value of from 4 to 9, and continuing to stir at from 40 to 80° C. for from 0.5 to 3 hours;

c) then adding an aqueous emulsion comprising an epoxy resin and comprising an epoxy resin hardener and continuing to stir at from 40 to 80° C. for from 0.5 to 3 hours;

d) adding an aqueous emulsion of the water-emulsifiable organic compound serving as phlegmatizer and adjusting the pH to a value of from 5 to 9, and continuing to stir at from 20 to 90° C. for from 0.5 to 3 hours and e) then filtering the product and drying the same at temperatures from 80 to 150° C.

14. The process for preparing a stabilized, pulverulent red phosphorus material, as claimed in claim 13, wherein the emulsion obtained after step a) is filtered and the resultant silver-containing red phosphorus material is dried at temperatures from 80 to 150° C.

15. The process for preparing a stabilized, pulverulent red phosphorus material, as claimed in claim 13, wherein only steps a) and b) are carried out and the resultant silver-containing red phosphorus material stabilized by a metal hydroxide is dried at temperatures from 80 to 150° C.

16. The process for preparing a stabilized, pulverulent red phosphorus material, as claimed in claim 13, wherein only steps a) to c) are carried out and the resultant silver-containing red phosphorus material stabilized by a metal hydroxide and by a synthetic thermoset resin is dried at temperatures from 80 to 150° C.

17. The process for preparing a stabilized, pulverulent red phosphorus material, as claimed in claim 13, wherein only steps a), b), and d) are carried out and the resultant silver-containing red phosphorus material stabilized by a metal hydroxide and provided with a phlegmatizer is dried at temperatures from 80 to 150° C.

18. The process for preparing a stabilized, pulverulent red phosphorus material as claimed in claim 13, wherein the materials used in each instance comprise, as desired, from 76 to 99.2% by weight of red phosphorus, from 0.05 to 2% by weight of water-soluble silver compound, from 0.5 to 10% by weight of metal hydroxide, metal oxide hydrate, or metal oxide from 0.2 to 10% by weight of synthetic thermoset resin, and from 0.05 to 2% by weight of phlegmatizer.

19. A flame retardant comprising the stabilized, pulverulent red phosphorus material as claimed in claim 1.

20. The stabilized, pulverulent red phosphorus material as claimed in claim 1, which comprises from 0.1 to 0.4% by weight of silver.

21. The stabilized, pulverulent red phosphorus material as claimed in claim 1, which comprises amounts of from 1 to 3% by weight of the metal hydroxides.

22. The stabilized, pulverulent red phosphorus material as claimed in claim 5, which comprises amounts of from 2 to 5% by weight of the thermoset resin.

23. The stabilized, pulverulent red phosphorus material as claimed in claim 8, which comprises from 0.3 to 1.5% by weight of the phlegmatizer.

* * * * *